UNITED STATES PATENT OFFICE.

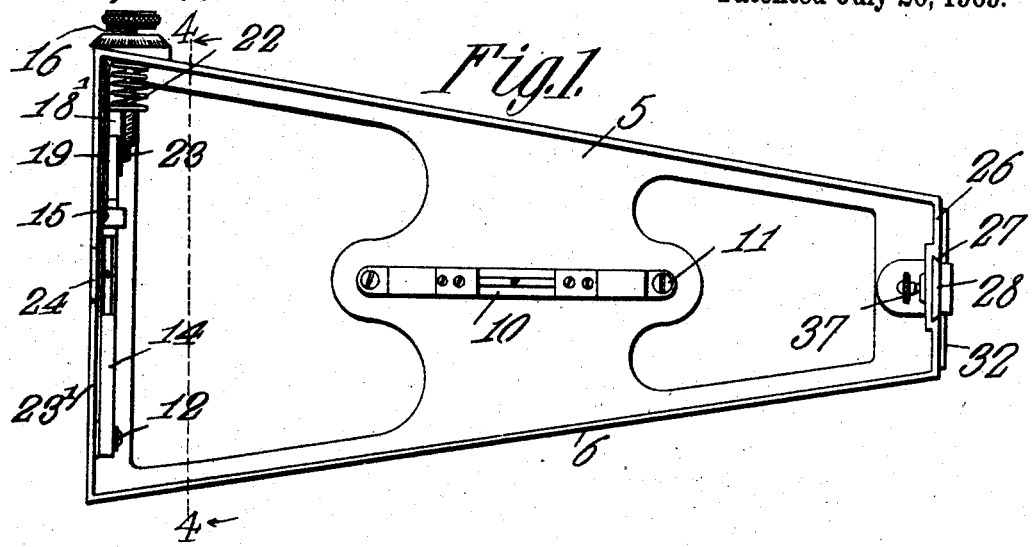
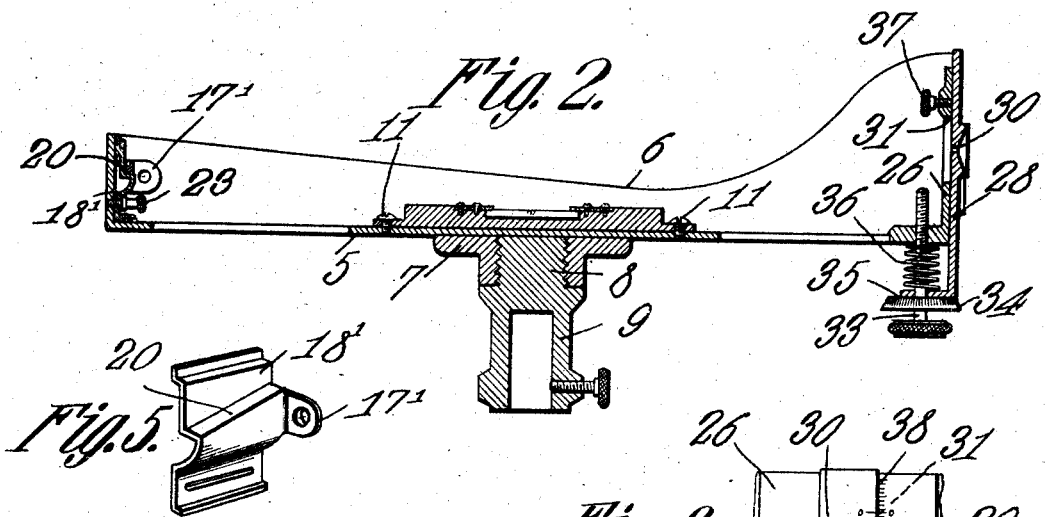
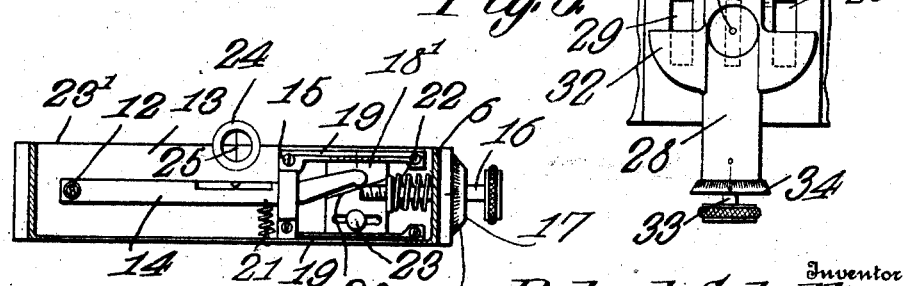

ROBERT SOBOTKA, OF HARTSELLE, ALABAMA.

GRADIENT INSTRUMENT.

No. 928,557.  Specification of Letters Patent.  Patented July 20, 1909.

Application filed July 24, 1908. Serial No. 445,242.

*To all whom it may concern:*

Be it known that I, ROBERT SOBOTKA, a citizen of the United States, residing at Hartselle, in the county of Morgan and State of Alabama, have invented a new and useful Gradient Instrument, of which the following is a specification.

This invention relates to leveling instruments and has for its object to provide a comparatively simple and thoroughly efficient instrument of this character especially designed for leveling, ditching and grading land and the like.

A further object of the invention is to provide a leveling instrument including a supporting frame having a plurality of spirit levels mounted thereon and disposed at right angles to each other, one of said spirit levels being adjusted vertically of the frame.

A further object is to provide a leveling instrument having an eye piece mounted for vertical movement on one end thereof and provided with a sight opening, there being cross level projections or lugs extending laterally from the opposite sides of the eye piece and co-acting with suitable sight openings formed in the adjacent end of the supporting frame.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Figure 1 is a plan view of a leveling instrument constructed in accordance with my invention. Fig. 2 is a longitudinal sectional view of the same. Fig. 3 is a detail front elevation. Fig. 4 is a transverse sectional view taken on the line 4—4 of Fig. 1. Fig. 5 is a perspective view of the slide detached.

Similar numerals of reference indicate corresponding parts in all of the figures of the drawings.

The improved leveling instrument forming the subject matter of the present invention includes a supporting plate 5, substantially in triangular shape, as shown, and provided with a vertically disposed marginal flange 6.

Secured to the base of the plate 5 is an enlargement 7 having a threaded opening formed therein for the reception of the correspondingly threaded end 8 of a socket piece 9, the latter being adapted to receive a standard or tripod when the instrument is used in a field.

Mounted on the upper surface of the plate 5 and preferably extending longitudinally thereof is a spirit level 10, said level being rigidly secured to the plate by screws or similar fastening devices 11.

Pivotally mounted at 12 on the rear wall 13 of the instrument is a transversely disposed spirit level 14, the free end of which is movable vertically in a suitable keeper 15.

Passing through the flange 6 is an adjusting screw 16 to which is rigidly secured a circular plate or disk 17, the peripheral edge of which is graduated, as indicated at 18. The inner end of the screw 16 engages the threaded opening in a lug 17' carried by a slide 18', the latter being retained in position on the wall 13 by means of angle irons 19, one of which is formed integral with the keeper 15 and is provided with graduations constituting a scale, as shown. The slide 18' is provided with an inclined shoulder 20 which forms a support for the free end of the level 14 so that as the screw 16 is adjusted the latter will actuate the slide to raise and lower the level and thus permit the operator to find the true horizontal level when the frame 5 is supported at an angle or inclination.

A coiled spring 21 serves to normally and yieldably support the free end of the level 14 against the inclined shoulder 20, while a similar spring 22 is interposed between the lug 17' and flange 6 to assist in taking up any wear on the threads of the adjusting screw.

The slide 18' is locked in adjusted position by means of a clamping screw 23, which latter extends through a horizontal slot in the slide for engagement with a threaded aperture in the wall 13, as shown.

The upper edge of the rear wall 13 is arranged in a horizontal plane and forms an objective sight 23', the intermediate portion of the wall 13 being cut away to receive a ring or annulus 24 having intersecting sight lines or hairs 25 extending across the same, as shown.

The front wall 26 of the supporting plate is provided with a vertically disposed dovetailed recess 27 in which is slidably mounted an eye piece 28, there being eye apertures 29 formed in the wall 26 on each side of the eye piece, as shown. The member 28 is provided with a sight opening 30 which registers with an elongated aperture 31 formed in the wall 26 between the apertures 29.

Extending laterally from the opposite longitudinal edges of the adjustable eye piece 28 are ears or lugs 32, the upper edges of which are disposed in the same horizontal plane and constitute cross level sights so that the operator may look through the openings 29 at the objective sight 23′.

An adjusting screw 33 similar in construction to the screw 16 is threaded in the base plate 5 at the forward end of the instrument and is provided with a disk 34 upon which rests the angular extension 35 of the eye piece, there being a spring 36 interposed between the extension 35 and bottom of the plate 5 in order to take up any wear on the threads of the screw 33.

In order to lock the sight piece in adjusted position, a clamping screw 37 is provided, which latter extends through the front wall 26 of the instrument for engagement with the rear face of the sight piece, thereby to force the inclined edges of the sight piece against the dovetailed walls of the slot 27.

Suitable graduations 38 are also formed on the front wall 26 of the supporting frame. The screw 33 is threaded at such a pitch as to change the line of grade in the ratio of one foot per one-hundred feet, in one revolution, while the disk 34 is graduated into one-hundred equal parts, each of which represents 1/100 of a foot grade in a distance of 100 feet. The scale 38 is also graduated in such a manner that one revolution of the adjacent adjusting screw corresponds to one graduation on the scale so that any number of revolutions of the screw can be read from the scale. It will thus be seen that by manipulating the screw 33 and sighting through the opening 30 at the intersecting lines 25, the operator may readily determine the grade or pitch, while by sighting through the apertures 29 at the objective sight 23′ the operator is enabled to clearly discern the rodman and work, making it possible to lay out terraces, hill side ditches or farms very rapidly.

From the foregoing description it is thought that the construction and operation of the device will be readily understood by those skilled in the art and further description thereof is deemed unnecessary.

Having thus described the invention what is claimed is:

1. A leveling instrument including a frame having an objective sight and provided with stationary and movable levels disposed at right angles to each other, and a sight piece carried by and adjustable vertically of the frame.

2. A leveling instrument including a frame having an objective sight and provided at one end with spaced apertures, a spirit level mounted on the frame, and an eye piece adjustable vertically to the frame and provided with oppositely disposed lugs movable over said apertures and constituting cross level sights.

3. A leveling instrument including a supporting frame, having an objective sight, a spirit level pivotally mounted on one end of the frame, an eye piece adjustable vertically of the opposite end of the frame, means for adjusting the pivoted end of the spirit level, and means for locking the eye piece in adjusted position.

4. A leveling instrument including a frame, having an objective sight, a spirit level pivotally mounted on one end of the frame, a stationary spirit level mounted on the intermediate portion of the frame, there being spaced apertures formed in the opposite end of said frame, a vertically adjustable eye piece slidably mounted on the frame and provided with a sight opening, and lugs extending laterally from the eye piece and movable over the frame at said apertures, said levels constituting cross level sights.

5. A leveling instrument including a frame having a ring mounted on one end thereof and provided with intersecting sight lines, there being spaced apertures formed in the opposite end of the frame, and a sight piece adjustable vertically of the frame and provided with oppositely disposed lugs movable over the frame at said apertures, and constituting cross level sights, there being a sight opening formed in the adjustable eye piece between the lugs.

6. A leveling instrument including a supporting frame, having an objective sight, relatively stationary and movable spirit levels mounted on the frame, a sight piece adjustable vertically of one end of the frame and provided with an angularly disposed arm, an adjusting screw extending through said arm and engaging the supporting frame, and a disk mounted for rotation with the screw and forming a support for the arm.

7. A leveling instrument including a supporting frame, having an objective sight, a spirit level carried by the frame, an eye piece mounted for vertical movement on one end of the frame and having its intermediate portion provided with a sight opening and one end thereof extended laterally to form an angularly disposed arm, an adjusting screw extending through said arm and engaging the threaded aperture in the supporting frame, and a spring interposed between the supporting frame and said arm.

8. A leveling instrument including a supporting frame, an annulus secured to one end of the frame and provided with intersecting sight lines, a spirit level pivotally mounted on the frame beneath the annulus, a slide mounted on the frame and provided with an inclined shoulder forming a support for the free end of the level, an adjusting screw threaded in the frame for adjusting the slide, a disk carried by the screw, a spring interposed between the slide and supporting frame, and an eye piece arranged at the opposite end of the frame and adjustable vertically of the latter.

9. A leveling instrument including a substantially triangular frame, an annulus mounted on the large end of the frame and provided with intersecting sight lines, a spirit level pivotally mounted on said frame beneath the annulus, means for adjusting the pivoted end of the level, there being spaced apertures formed in the reduced end of the frame, an eye piece adjustable vertically of the reduced end of the frame and provided with oppositely disposed lugs movable over the frame at said apertures, and constituting cross level sights, there being a sight opening formed in the eye piece between the lugs, means for adjusting the eye piece vertically of the frame, and means for locking the eye piece in adjusted position.

10. A leveling instrument including a supporting frame, relatively stationary and movable spirit levels mounted on the frame, an enlargement secured to the frame and provided with a threaded opening, a socket member engaging the threads of said opening, means for adjusting the movable level, an annulus secured to the frame above the movable level and provided with intersecting sight lines, there being spaced apertures formed in one end of the frame, an eye piece adjustable vertically of the frame and provided with oppositely disposed lugs movable over the frames at said apertures, and constituting cross level sights, means for adjusting the eye piece vertically of the frame, and means for locking said eye piece in adjusted position.

11. A leveling instrument including a supporting frame, a level pivotally mounted on one end of the frame, an adjusting member slidably mounted on the frame and provided with an inclined shoulder forming a support for the free end of the level, and a screw for actuating the adjusting member.

12. A leveling instrument including a supporting frame, a level pivotally mounted on the frame, a keeper secured to said frame and provided with a scale, a plate slidably mounted on the frame and having an inclined shoulder forming a support for the free end of the level, there being a perforated lug extending laterally from one end of the plate, and a slot formed in the body thereof, an adjusting screw extending through the supporting frame for engagement with the lug on the plate for adjusting the latter to raise and lower the level, a spring interposed between the lug and supporting frame, a graduated disk secured to and movable with the screw, and a spring for normally and yieldably supporting the free end of the level in engagement with the inclined shoulder of the adjustable plate.

In testimony that I claim the foregoing as my own, I have hereto affixed my signature in the presence of two witnesses.

ROBERT SOBOTKA.

Witnesses:
 EUGIE P. JOHNSON,
 ZACK SWAN.